(12) United States Patent  
Williams

(10) Patent No.: US 8,540,287 B2  
(45) Date of Patent: Sep. 24, 2013

(54) SADDLE TAP CONNECTION AND INSTALLATION DEVICE

(75) Inventor: Doug Williams, San Rafael, CA (US)

(73) Assignee: ATS Products, Inc., Richmond, CA (US)

( * ) Notice: Subject to any disclaimer, the term of this patent is extended or adjusted under 35 U.S.C. 154(b) by 0 days.

(21) Appl. No.: 13/370,002

(22) Filed: Feb. 9, 2012

(65) Prior Publication Data

US 2012/0200079 A1  Aug. 9, 2012

Related U.S. Application Data

(60) Provisional application No. 61/441,235, filed on Feb. 9, 2011, provisional application No. 61/538,776, filed on Sep. 23, 2011.

(51) Int. Cl.
*F16L 41/00* (2006.01)

(52) U.S. Cl.
USPC .................................. 285/197; 137/15.12

(58) Field of Classification Search
USPC ................ 285/197, 200; 137/15.12, 15.13
See application file for complete search history.

(56) References Cited

U.S. PATENT DOCUMENTS

| | | | | |
|---|---|---|---|---|
| 501,715 A * | 7/1893 | Hardwick | | 285/200 |
| 3,072,119 A * | 1/1963 | Matheson | | 285/200 |
| 4,654,942 A * | 4/1987 | Rush et al. | | 285/197 |
| 4,708,374 A * | 11/1987 | Cox | | 285/197 |
| 4,747,625 A * | 5/1988 | Mignet et al. | | 285/197 |
| 4,848,801 A * | 7/1989 | Grabowski | | 285/200 |
| 4,852,916 A * | 8/1989 | Johnson | | 285/200 |
| 5,280,971 A * | 1/1994 | Tokutake et al. | | 285/197 |
| 5,314,212 A * | 5/1994 | Sanders | | 285/197 |
| 5,326,139 A * | 7/1994 | Corcoran | | 285/197 |
| 5,388,869 A * | 2/1995 | Suzuki et al. | | 285/197 |
| 5,439,256 A * | 8/1995 | Brainard | | 285/200 |
| 5,605,361 A * | 2/1997 | Sims | | 285/197 |
| 5,951,062 A * | 9/1999 | Miller | | 285/197 |
| 6,089,615 A * | 7/2000 | Jappinen | | 285/197 |
| 6,250,687 B1 * | 6/2001 | Voigt | | 285/197 |
| 6,406,067 B1 * | 6/2002 | Pritchatt | | 285/197 |
| 6,508,490 B1 * | 1/2003 | Hoffman | | 285/197 |
| 6,588,767 B2 * | 7/2003 | Kane | | 285/197 |
| 7,007,980 B2 * | 3/2006 | Otsuga et al. | | 285/197 |
| 7,523,965 B2 * | 4/2009 | Masarwa | | 285/200 |
| 2003/0173777 A1* | 9/2003 | Jeong | | 285/197 |
| 2004/0135367 A1* | 7/2004 | Otsuga et al. | | 285/197 |
| 2012/0080879 A1* | 4/2012 | Gauthier | | 285/197 |

* cited by examiner

*Primary Examiner* — David E Bochna
(74) *Attorney, Agent, or Firm* — Kilpatrick Townsend & Stockton LLP

(57) ABSTRACT

Internal collars and external saddle taps can be used to install taps on a main duct in a manner that maintains duct section joint integrity. A saddle tap assembly may include an external slip tap, internal tap collar, a duct section, and adhesive. The external slip tap and the internal tap collar may each have a flange. The flanges may be curved. The flange of the internal collar may have a sheared portion permitting the flange of the internal collar to pass through an opening in a section of duct. The duct may have an opening with one or more notches. A method of installation can be more efficient and more cost-effective than prior solutions. An installation tool can be used for installing saddle tap assemblies while an adhesive cures.

17 Claims, 12 Drawing Sheets

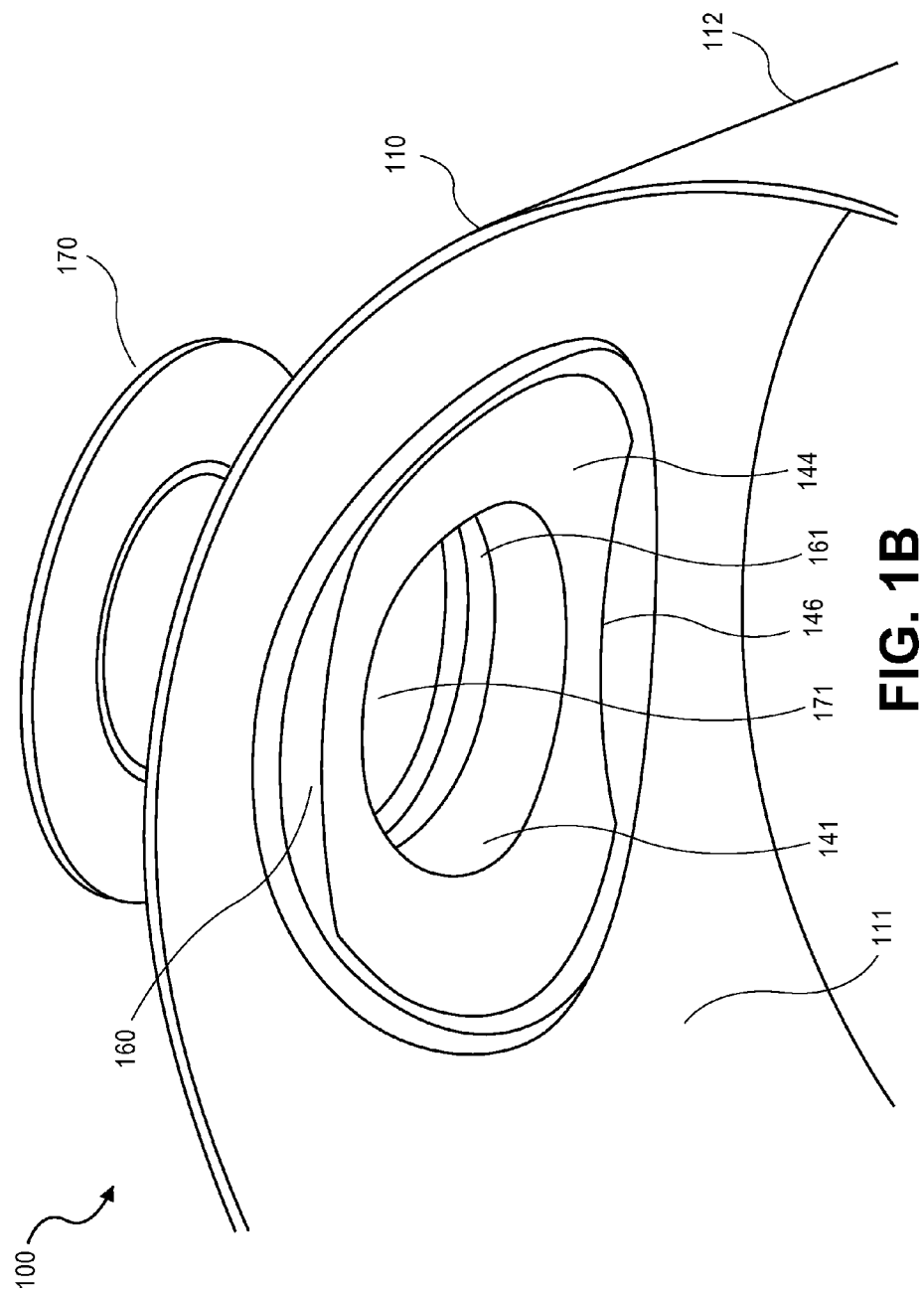

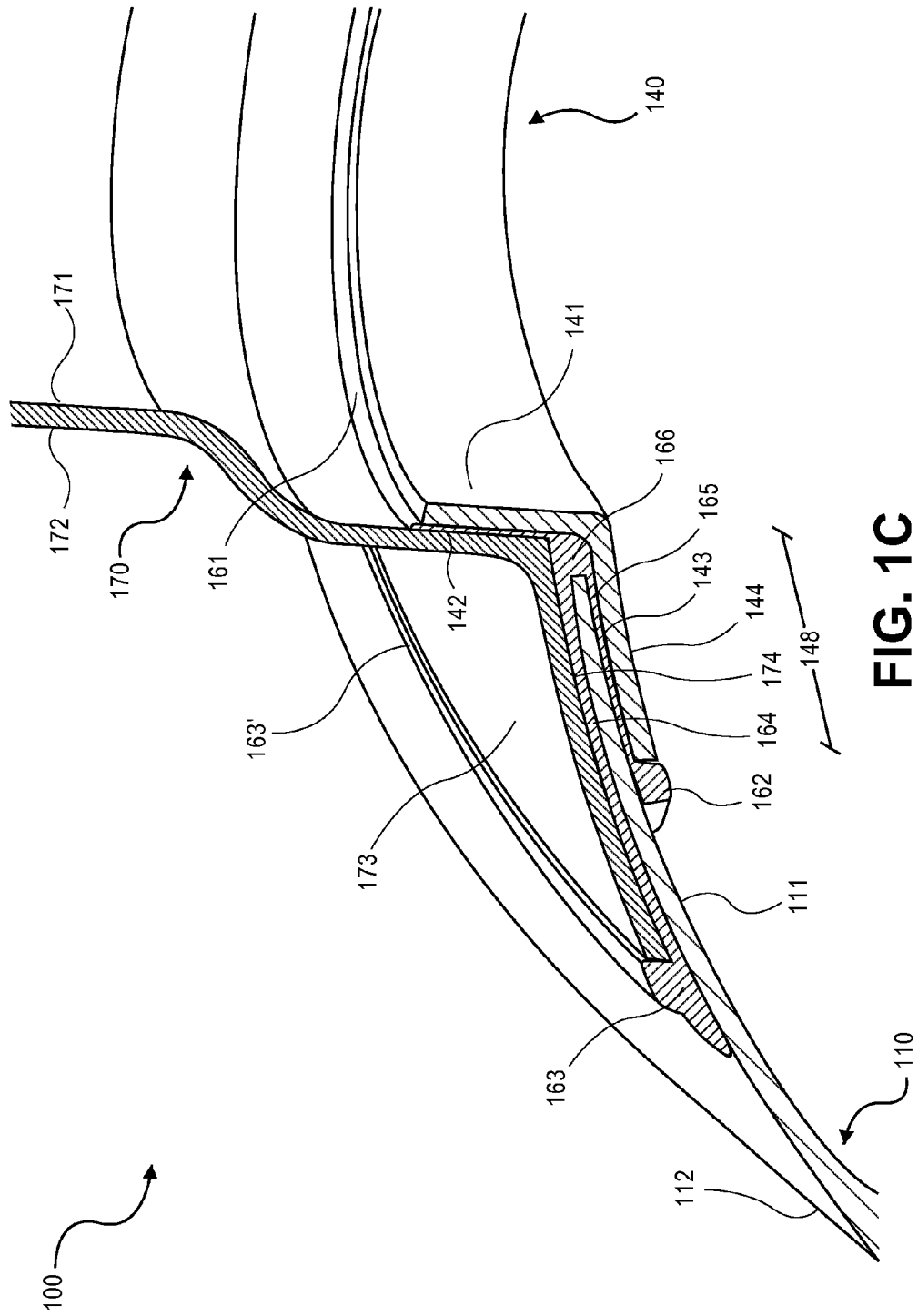

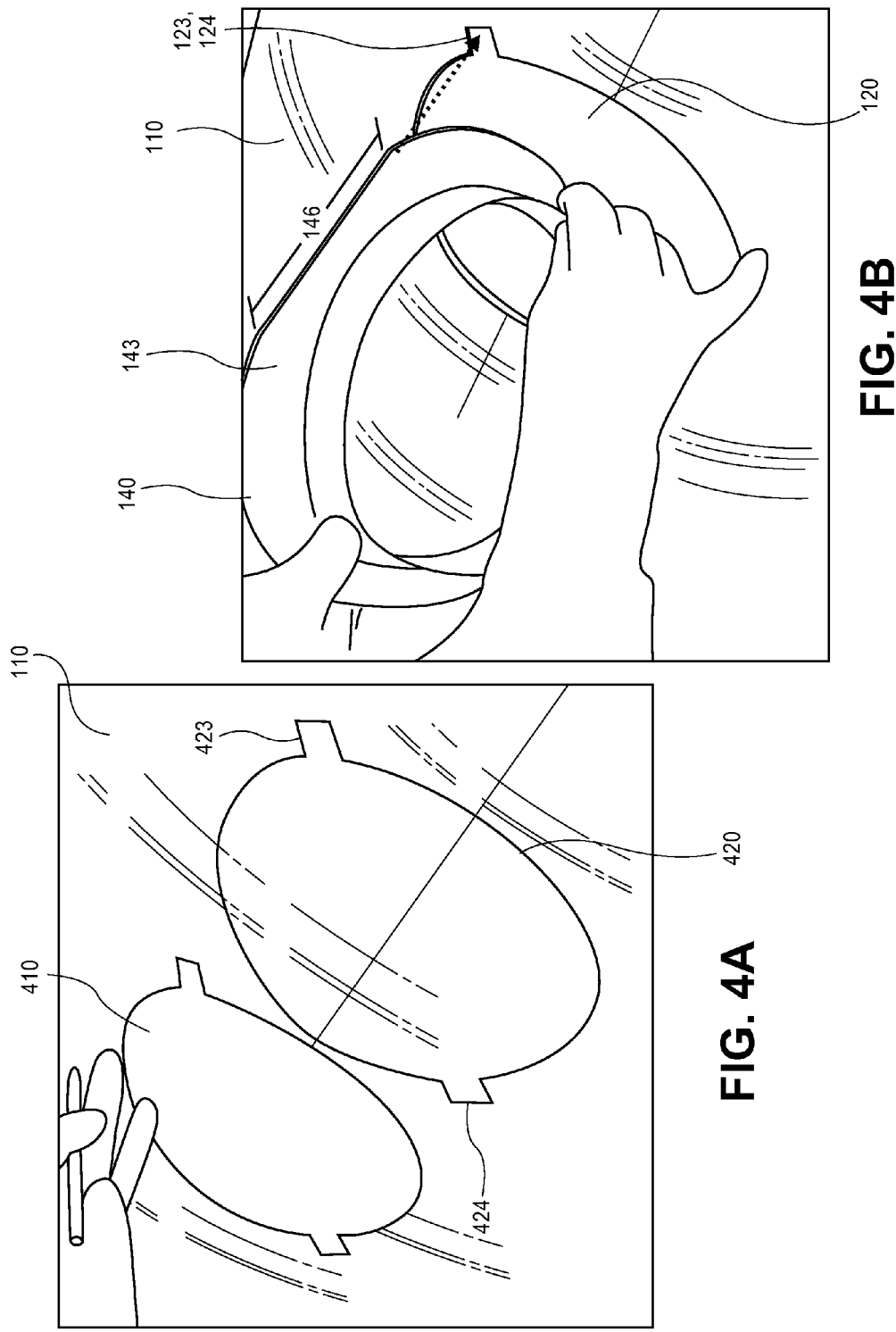

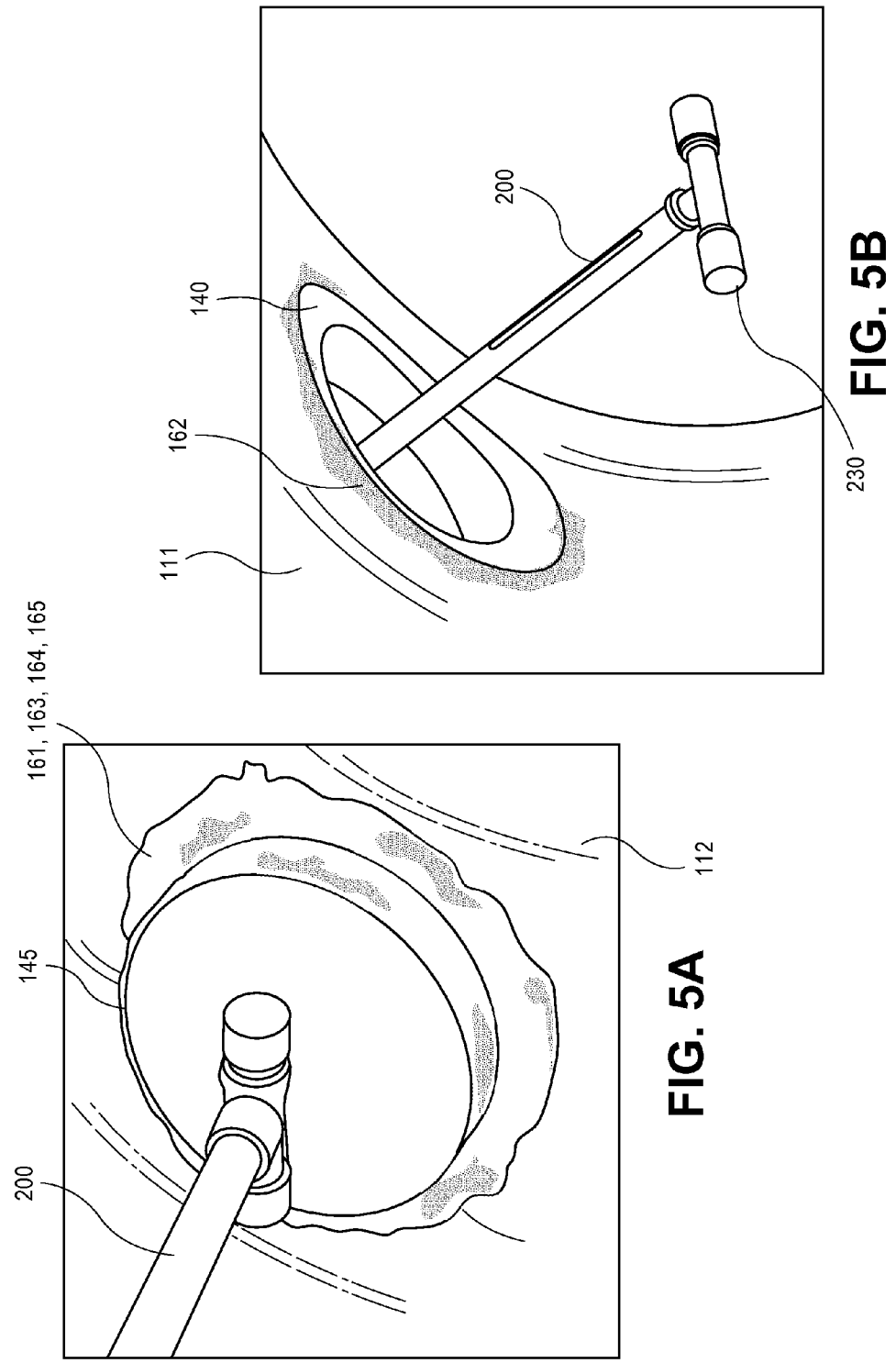

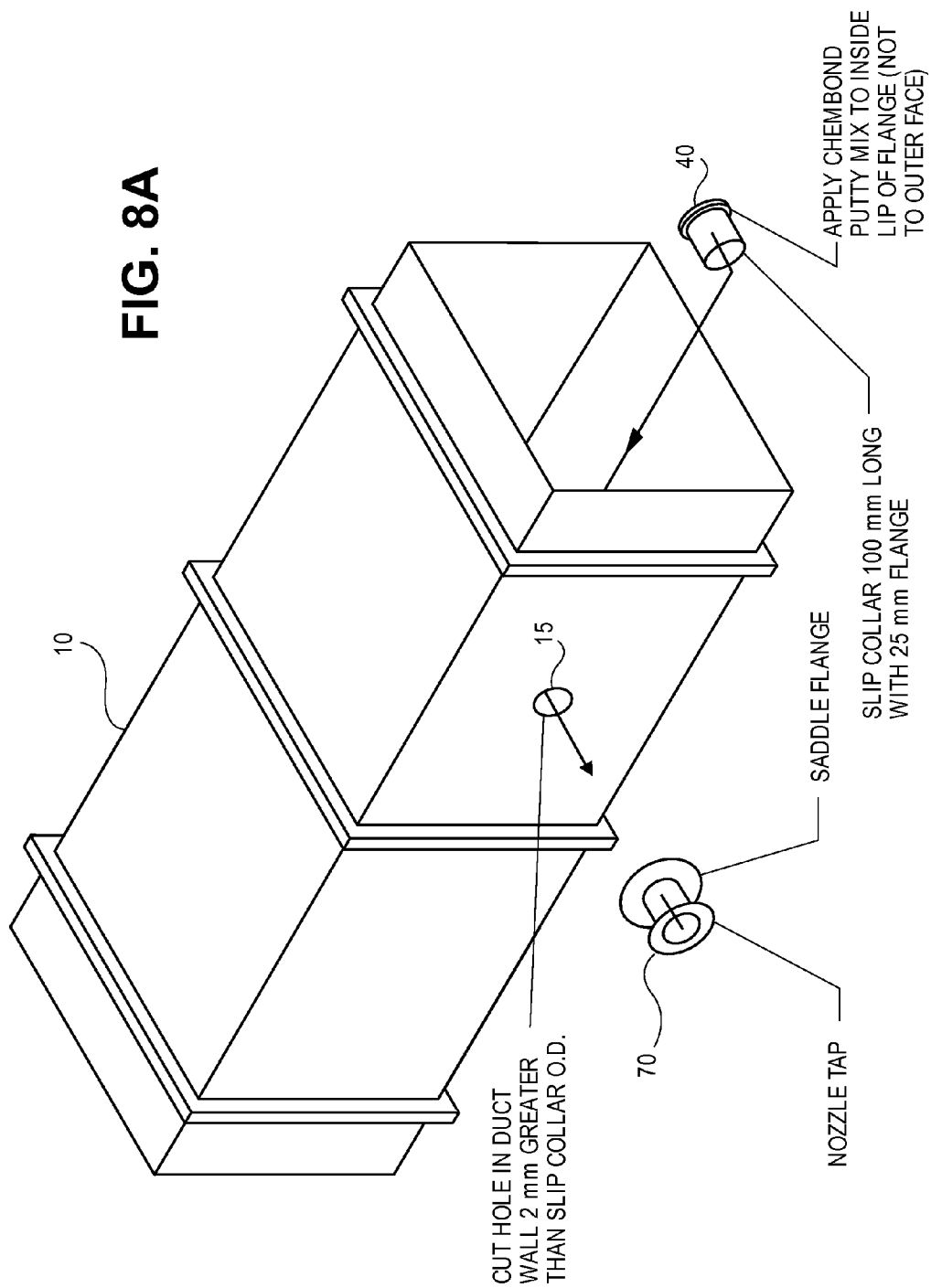

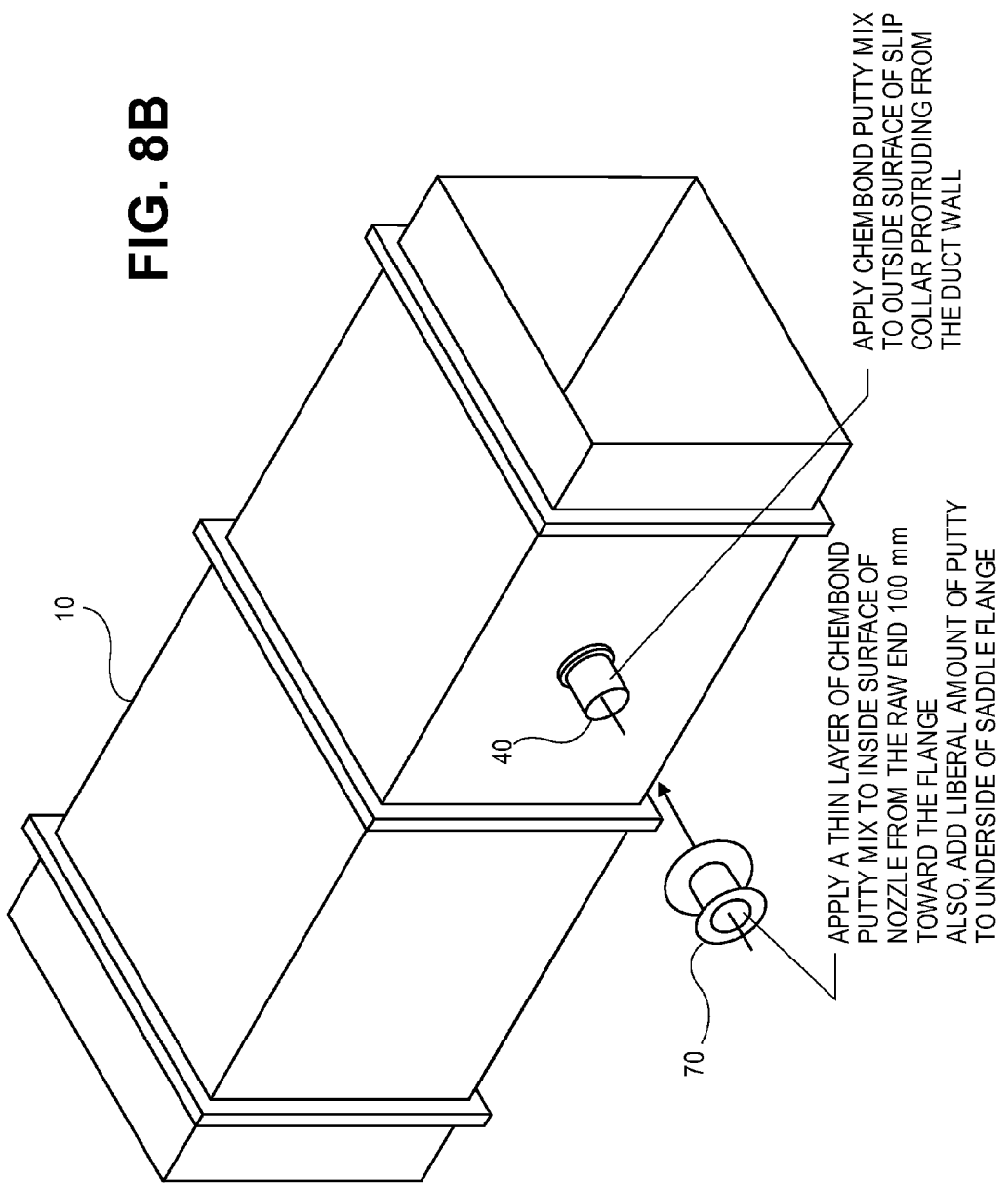

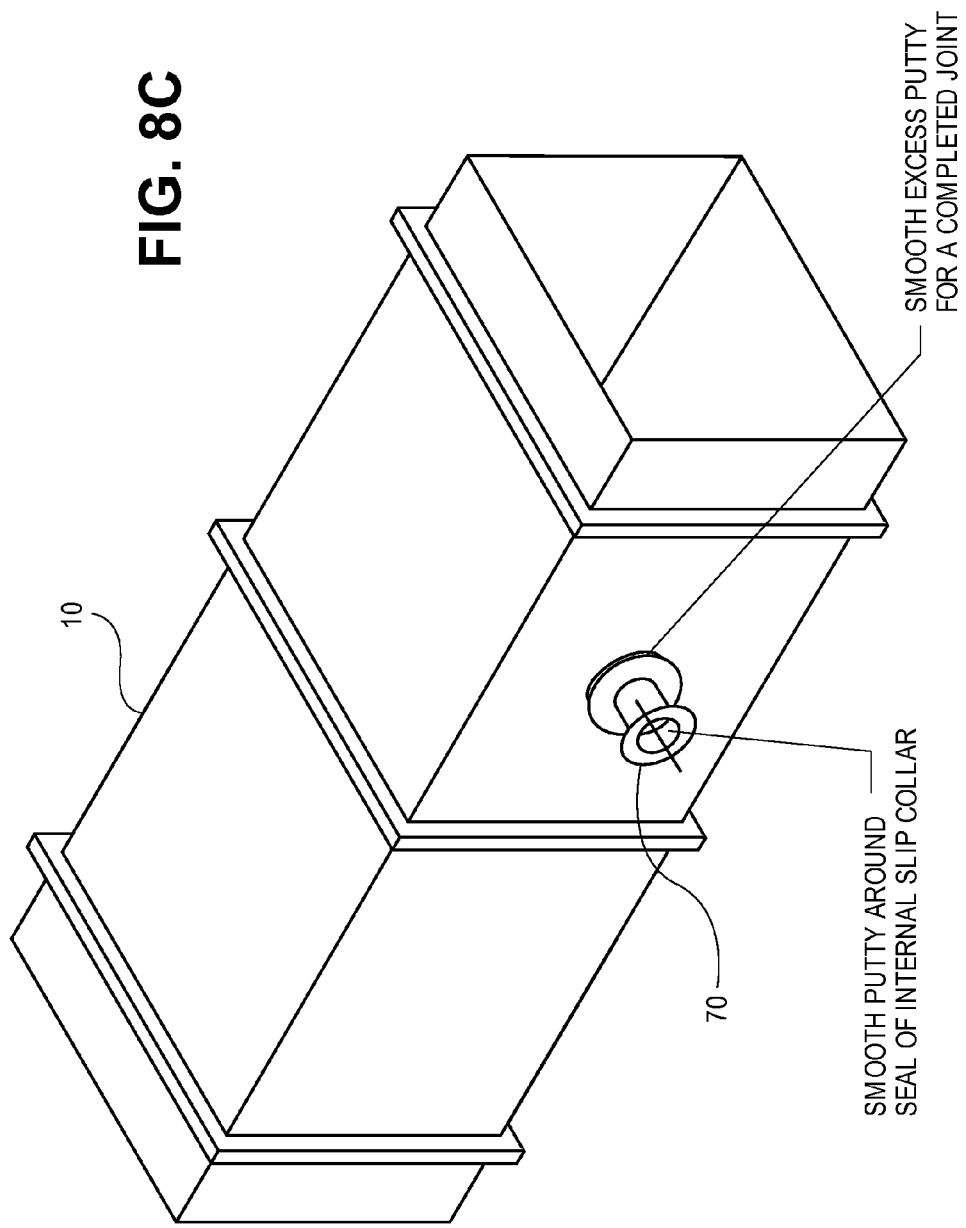

SADDLE TAP CONNECTION AND INSTALLATION DEVICE

CROSS-REFERENCES TO RELATED APPLICATIONS

The present application is a non-provisional application of and claims priority to U.S. Provisional Application Nos. 61/441,235 and 61/538,776, filed on Feb. 9, 2011 and Sep. 23, 2011, respectively, the entire contents of which are herein incorporated by reference for all purposes.

BACKGROUND

Ductwork for corrosive vapor exhaust systems is used extensively in many diverse industries which utilize hazardous chemicals to process raw materials or perform manufacturing procedures. Such industries include the semiconductor, silicon wafer, plating, pharmaceutical, wastewater treatment, solar wafer, solar cell, disc drive, memory, picture tube, and flat panel production industries. Specifically, in semiconductor fabrication facilities, many different processes require ventilation of hazardous materials; for example, robotic wet benches, gas cabinets, tanks, photo resist, and dry etchers to name a few. Such ductwork also is required in many research and development laboratories, which use highly reactive, toxic, or otherwise hazardous chemicals. Such chemicals not only can put workers at risk to hazardous fumes but also are potential sources of contamination. Consequently, to be safely removed from work areas, vapors from hazardous chemicals must be exhausted through leak-proof air ducts. Duct installations can be very large, consisting of many thousands of feet of ductwork, which may be manifolded and connected to multiple exhaust fans. Forming these duct installations is a time-consuming process.

Each connection between different duct sections requires a leak-proof joint to maintain the integrity of the system. Since a leak-proof joint is required at each connection, even the smallest installation requires a considerable number of such joints. Joints must not only prevent fumes from escaping in day-to-day operations, but must also remain leak-proof after prolonged exposure to corrosive or otherwise reactive chemicals. Also, joints must not fail catastrophically in the event a flame propagates through the interior or, if exposed directly to heat such as from a fire external to the ductwork, fail mechanically or become a source of smoke particulates and other contaminants.

Typically, ducts are fabricated as sections of standard length(s), which are transported to a job site and assembled there. Duct sections may need to be connected to other duct sections, sometimes different sized or shaped ducts, to accommodate the design of the duct system or the placement of machinery that requires ventilation. One method of connecting ductwork is using a saddle tap that is bonded to the main duct.

If the exact locations of each tap are known, the taps may be attached to the duct sections during manufacturing according to specifications. If, however, the desired locations of each tap are not known, or the installation requires flexibility at the job site, the taps must be installed at the job site. On-site installation of the taps using conventional processes is an expensive and time-consuming process. Additionally, the process requires skilled labor, and if done incorrectly, the integrity of the entire system is compromised. For example, the strength of the duct near the traditional tap may be compromised or the joint may not be leak-proof.

There are several methods that have been used for on-site installation of taps to main duct sections. One process is to cut an opening or a hole in the main duct and attach a raw secondary duct. A raw duct does not have a fitting, such as a flange, on its ends. After the hole is cut, the inside edges of the main duct (where the hole was cut) must be sanded and sealed to maintain the ducts' leak-proof qualities. The labor-intensive sanding is very messy and takes time to complete and clean up. Unless mating surfaces near the hole in the main duct and the ends of the secondary duct section are first sanded or otherwise polished, the interposing sealant layer may not uniformly adhere to the surfaces. Pores could form in the hardened sealant, and fumes could leak through the pores.

After the sanding is completed, the raw end of the secondary duct is placed into the hole in the main duct. The secondary duct section must be held in place for the remainder of the installation process by another person or temporary fastening devices (e.g., clamps, stands, etc.). The installer must then make a first seal on the outside of the main duct and secondary duct using resin and fiberglass. Then a second seal must be completed on the inside of the main duct where the secondary duct has been inserted into the main duct. This process takes a long time (3-5 hours) and requires skilled labor.

A method for sealing and reinforcing a joint is to form a "lay-up" bond by tightly winding alternate layers of fine boat cloth mesh and a combination of fiberglass sheeting and coarse woven roving mesh around the joint seam. The larger the duct diameter, the more layers must be used. Each time a dry layer is wound, a "wet out" process using a resin component of the sealant must be completed. Lay-up reinforcement substantially strengthens the joint to the extent that, under tensile loading, the duct material is likely to rupture before the joint fails. While not as significant a cost driver as sanding, the lay-up method also entails considerable time and labor.

Another method of installing taps to main duct sections is using a tap with a saddle flange. The installer cuts an opening or hole in the main duct. Again, the inside edges of the main duct must be sanded and sealed. The bonding agent or adhesive is applied to the backside of the saddle flange, and the saddle flange is placed against the duct. The tap must then be held in place for the remainder of the installation, while the adhesive cures. The installer must apply a glass and resin "lay-up" on the outside of the saddle flange to hold the flange onto the outer surface of the main duct. Typically, the bond formed by the lay-up is wider than the saddle flange. An inside "lay-up" may also be required. Additionally, the installer must seal the inner edges of the main duct, where the hole was cut. Again, this process takes a long time and requires skilled labor.

Consequently, there is a need for a faster, easier and thereby more cost-effective method for maintaining duct section joint integrity. To streamline ductwork assembly, attachment of an assembly implementing the method should be simple and reliable. Embodiments of the invention address these and other problems.

BRIEF SUMMARY

A saddle tap connection according to embodiments of the present invention may be made without the use of screws or bolts, inside or outside "lay-ups," or extensive sanding and cleaning. Embodiments of the invention include an internal slip collar with a slip collar flange that is adapted to be cooperatively coupled to a saddle tap with a saddle flange. The internal slip collar and saddle tap may each have a cylindrical portion. The outside diameter of the cylindrical portion of the internal slip collar is approximately the same size as the inside diameter of the cylindrical portion of the saddle tap. This sizing allows the saddle tap to securely fit over the internal slip collar without excessive play (e.g., less than 2 mm, depending on size of the saddle tap assembly). In conjunction with an appropriate adhesive, the internal slip collar is inserted into an opening (or hole) in a main duct. The outside diameter of the cylindrical portion of the internal slip collar and the inside diameter of the cylindrical portion of the saddle tap may be sized so that a suitable amount of adhesive may fit between them (e.g., a thin layer). The slip collar flange prevents the slip collar from going through to the outside of the main duct. Again, with appropriate adhesives, the saddle tap is slid over the cylindrical portion of the internal slip collar. Clamps or an installation tool may be fastened while the adhesive cures, and the excess adhesive can be cleaned and removed. Once cured, the saddle tap slip collar assembly provides a leak-proof joint.

Embodiments of the present invention are advantageous especially in scenarios where the final facility design (where the duct system will be installed) has been approved, the tools for the facility have been ordered, the duct system is delivered and ready to install, and then there is a change to the plans. Many changes at the last minute could occur. For example, the facility design is modified, the tools need to be moved, and the duct layout is significantly reconfigured. Using embodiments of the present invention, the installer can install the main trunk lines prior to a finalized tool layout. Then, after the required locations are set, the installer can safely and efficiently install lateral taps with 100% no-leak assurance. Embodiments of the present invention improve installation speed and flexibility and create improved leak-proof seals.

An embodiment of the invention is directed to a saddle tap assembly comprising an internal slip collar with a flange end and a collar end and an external saddle tap with a saddle flange end. The collar end may be configured to fit into an opening in a section of duct. The flange end may be configured to prevent the internal slip collar from completely passing through the opening. The saddle tap may be configured to slide over the internal slip collar on an outside surface of the duct.

Another embodiment of the invention is directed to an internal slip collar comprising a cylindrical portion having a first end and a second end and a flange. The cylindrical portion may define a passageway between the first end and the second end. The flange may be coupled to the second end, and the first end may be adapted to fit through an opening in a duct section Therefore, the flange may prevent the internal slip collar from completely passing through the hole in the duct section. An external saddle tap may be adapted to fit over the internal slip collar when the first end of the internal slip collar has been fit through the hole in the duct section.

An embodiment of the invention is directed to an external saddle tap comprising: a throat portion having a first end and a second end, wherein the throat portion defines a passageway between the first end and the second end; and a saddle flange coupled to the first end and adapted to fit over an internal slip collar, wherein the internal slip collar comprises a flange that prevents the internal lip collar from completely passing through the opening in the duct section and a cylindrical portion that defines a passageway through the internal slip collar.

Another embodiment of the invention is directed to a method of installing a saddle tap assembly including the steps of: obtaining a section of duct; obtaining an internal slip collar with a flange end and a collar end; obtaining an external saddle tap with a saddle flange end; cutting a hole in the duct, wherein the hole is sized to accept the collar end of the internal slip collar; disposing the internal slip collar in the hole; and disposing the external saddle tap over the internal slip collar, wherein the saddle flange end is positioned over the collar end of the internal slip collar.

A saddle tap assembly (e.g., an ATS SlipTap™) may include an external slip tap, internal tap collar, a duct section, and adhesive. Embodiments of the present invention provide for several layers of chemical protection as well as structural stiffening wherever the taps are located. As used herein, a "SlipTap assembly" may refer to an assembly comprising a internal collar, an external tap, and a duct section. The internal collar may be referred to as a collar, slip collar, tap collar, or the like. The external tap may be referred to as a tap, saddle tap, external saddle tap, or the like.

The internal tap collar comprises an internal slip collar flange, an inner surface, and an outer surface. An adhesive may have been applied to the inner lip of the flange of the slip collar. Adhesive may also be applied to the outer surface of the internal slip collar. A saddle tap may slide over the internal slip collar. The saddle tap comprises a saddle flange, an inner surface, and an outer surface.

Adhesive may have been applied to the underside of the saddle flange and the inner surface of the saddle tap.

These and other embodiments of the invention are described in further detail below.

BRIEF DESCRIPTION OF THE DRAWINGS

FIGS. 1A-C show an embodiment of the saddle tap, internal slip collar, and duct in accordance with the present invention.

FIGS. 4A-B show various steps for installing the saddle tap, internal slip collar, and duct in accordance with the present invention.

FIGS. 5A-B, 6A-B, and 7 show various steps for installing the saddle tap, internal slip collar, and duct with an installation tool in accordance with the present invention.

FIGS. 8A-C show an embodiment of the saddle tap, internal slip collar, and duct in accordance with the present invention and a method of installing the same.

In the Figures, like numerals designate like elements.

DETAILED DESCRIPTION

Figure 1A:
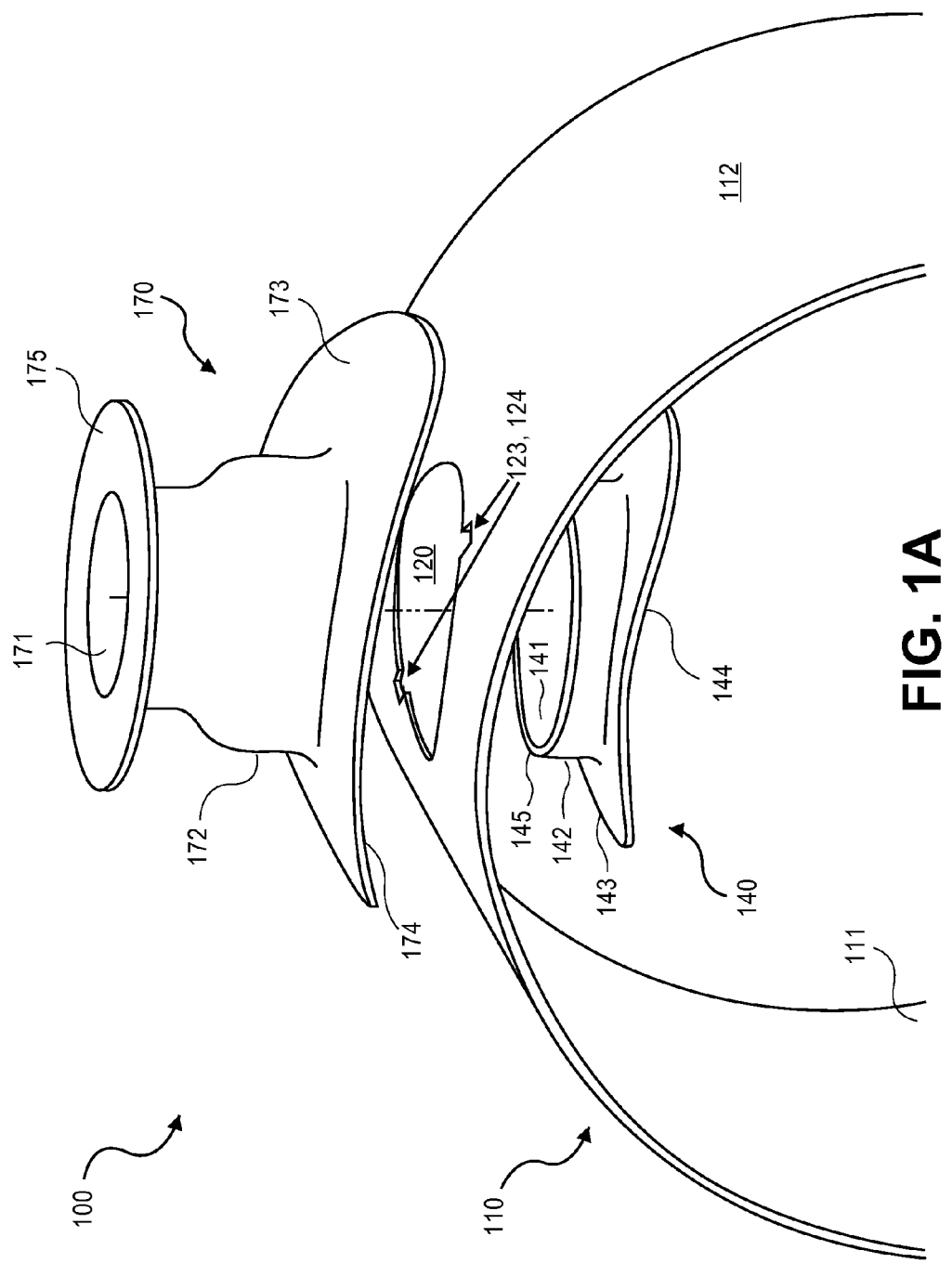

Embodiments of the invention are directed to saddle tap connections (e.g., saddle tap assemblies) with internal collars, external saddle taps, methods for making saddle tap connections, collars, saddle taps, and duct assemblies, and methods for joining ducts.

One embodiment of the present invention is directed to an internal slip collar (or internal tap collar) comprising a tubular or cylindrical portion and a slip collar flange. The tubular portion of the internal slip collar includes a flange end and a non-flange end. The internal slip collar flange is disposed at the flange end. The internal slip collar flange extends radially outward from the perimeter of the opening in the flange end of the tubular structure. The non-flange end has an opening defined by a circumference of the tubular portion. The non-flange end does not have a flange. The non-flange end has an inside diameter and an outside diameter. The internal slip collar with internal slip collar flange can be any suitable size.

One embodiment of the present invention is directed to a saddle tap with a saddle flange (or external slip tap). A saddle tap comprises a tubular portion. The tubular portion may have a variable diameter (see FIG. 1A) or may be a cylinder with a contestant diameter (see FIG. 8A). The tubular portion may have a variable diameter. The tubular portion of the saddle tap includes a first end with an opening defined by a circumference of the tubular portion. The saddle flange is disposed at the first end of the tubular portion of the saddle tap. The saddle tap flange extends radially outward from the perimeter of the opening in the first end of the tubular structure. In some embodiments, the saddle tap may be a nozzle tap, and a nozzle is disposed on a second end. In some embodiments, the second end may be an ISO Flange, H-Collar, internal beaded slip collar, raw duct end, or any other suitable connection. The saddle tap with saddle tap flange can be any suitable size.

One embodiment of the present invention is directed to connecting a saddle tap to a section of duct using an internal slip collar. In one embodiment, the duct is rectangular. In this case, the flange of the internal collar and the external saddle tap are substantially planar. In other embodiments, the duct is round or oval. In this case, the flange of the internal collar and external saddle tap are curved. The curved flanges are curved so that the flanges fit in cooperation with the duct. That is, the arc of the duct near the tap location is substantially similar to the curve/arc of the flange. The duct has an inside surface and an outside surface. The inside surface must withstand a corrosive environment and/or fires and explosions. The duct may be any suitable size.

One having skill in the art will recognize that the saddle tap with internal slip collar connection may be adapted to be used with square, rectangular, round, or oval shaped main ducts. In round and oval embodiments, the saddle flange and slip collar flange may be curved.

In one embodiment, a saddle tap with saddle flange is coupled to a duct using an internal slip collar with an internal slip collar flange. During installation of the saddle tap, a hole may be cut in the duct in a desired location. Alternatively, the opening may be pre-cut during manufacturing. The opening may be any suitable size, but is at least as large as an outside diameter of the non-flange end of the internal slip collar and is no greater than the diameter of the internal slip collar flange.

Embodiments of the present invention may use an adhesive to bond the SlipTap components to ductwork. The adhesive may be an epoxy-based adhesive that may bond metal to a fiber reinforced plastic material. Suitable adhesives are described in U.S. Pat. No. 5,549,949, which is hereby incorporated by reference in its entirety for all purposes. Chembond and XBond are examples of adhesives that may be used in accordance with the present invention.

An adhesive may be applied on an inside lip of the internal slip collar flange. The adhesive may be applied to the duct. The internal slip collar is inserted, from the inside of the duct, through the opening. Because the diameter of the internal slip collar flange is larger than the diameter of the opening, the tubular portion of the slip collar fits through the opening and the internal slip collar flange meets up against an inner surface of the duct. An inside seal is created where the internal slip collar flange and the inner surface of the duct meet. The tubular portion of the internal slip collar now protrudes through the duct opening to the outside surface of the duct.

One suitable duct is ATS 4910CR™ (commercially available from ATS Inc.), which utilizes a dual-laminate system. The corrosion resistant interior liner comprises a synthetic veil and glass reinforcement that is saturated with a vinyl ester resin. The vinyl ester resin provides a highly chemical resistant barrier. In addition to the corrosion resistant interior, the duct comprises is a fire resistant exterior. The exterior is fabricated with fire resistant phenolic resin. Other suitable ducts include ATS StaticSafe™ Duct, ATS Phenyline™ duct, and other ducts commercially available from other vendors.

After the internal slip collar is positioned, an adhesive may be placed on the outside surface of the tubular portion of the internal slip collar. An adhesive may be applied to an outside lip of the saddle flange. The saddle tap is placed over the tubular portion of the internal slip collar. An outside seal is created where the saddle tap flange and the outer surface of the duct meet. The tubular portion of the internal slip collar is now covered by the saddle tap.

Clamps are inserted through the inside of the saddle tap and internal slip collar to pull the saddle tap and internal slip collar together while the adhesive cures. When the clamps are tightened, the adhesive may seep out at the inside seal and the outside seal. The excess adhesive may be wiped away or cleaned up. When the adhesive has adequately cured, the clamps are removed and the saddle tap and internal slip collar form a tightly sealed unit.

Although air ducts and duct systems are described in detail in this application, it is understood that embodiments of the invention are not limited to air ducts and duct systems. For example, embodiments of the invention can also be used in piping systems that are used to transport liquids such as corrosive liquids.

I. Embodiments of an Exemplary Saddle Tap with Internal Slip Collar

FIGS. 1A-C show various views of a SlipTap assembly in accordance with the present invention. FIG. 1A shows an exploded view of a SlipTap assembly 100 comprising a duct section 110, an internal tap collar 140, and an external slip tap 170. The duct 110 can be any suitable length; only a small cross-section is shown in FIG. 1A for illustrative purposes. The duct may be any suitable diameter; for example, ATS manufactures duct in sizes ranging approximately from 2" (~50 mm) to 160" (~4000 mm). One having skill in the art will recognize that in addition to varying length and diameters of duct, the many shapes of duct may be used, including round, rectangular, and oval duct.

The internal tap collar 140 comprises a cylindrical portion, an inside surface 141 of the cylinder defining the inside diameter of the internal tap collar, and an outside surface 142 defining the outside diameter of the internal tap collar. The internal tap collar 140 further comprises a first end 145 for bonding to the external slip tap 170. Opposite the first end is a flange end. At the flange end, the internal tap collar 140 comprises a flange with a top flange surface 143 and a bottom flange surface 144. The flange extends radially outward from the perimeter of the opening in the flange end. The flange has a flange size measured by the distance from the perimeter of the opening to the outer edge of the flange. For example, if the internal tap collar cylinder has a diameter of 12" and the outer edge of the circular flange has a diameter of 15", then the flange size is 3". The internal tap collar 140 may comprise a fiber-reinforced plastic material.

The external slip tap 170 comprises a passageway defined by an inner surface 171 of the external slip tap, an exterior passageway surface 172 of the external slip tap, and a saddle flange end with a top saddle flange surface 173 and a bottom saddle flange surface 174. Opposite the saddle flange end is a second end 175. End 175 may have any suitable attachment means. In one embodiment, end 175 comprises a slip collar, such as ATS's H-Collar. Embodiments of a slip collar are described in application. Ser. No. 10/765,707, Jan. 26, 2004, which is hereby incorporated by reference in its entirety for all purposes. In one embodiment, end 175 comprises a flange assembly, such as described in U.S. Pat. No. 7,488,010, which is hereby incorporated by reference in its entirety for all purposes. In one embodiment, end 175 comprises an unfinished end (no pre-fabricated connection). The unfinished end may be adapted to connect to a slip collar or a flange assembly. The external slip tap 170 may comprise a fiber reinforced plastic material.

The duct 110 may comprise a fiber reinforced plastic material. The fiber reinforced plastic material preferably comprises a chemically resistant material and/or a fire-resistant material. The duct sections preferably include at least an outer fire-resistant portion and a chemically resistant inner portion. The duct 110 has an inside surface 111 and an outside surface 112. The inside surface may comprise a fluoropolymer film, which is resistant to corrosive chemicals and fire. The outside surface may also comprise a fire-resistant material.

Fiber reinforced plastic ducts, internal tap collars, and external slip taps are desirable since they are more universally adaptable to different chemicals than their metal counterparts. For example, metal internal tap collars or external slip taps may corrode when exposed to certain acids, whereas fiber reinforced plastic materials may not corrode as easily when exposed to the same acids. Also, ducts made from fiber-reinforced plastic materials are used in the semiconductor and other industries, and the internal tap collars and external slip taps according to embodiments of the invention are compatible with those fiber-reinforced plastic ducts. The cost of fiber reinforced plastic ducts and joints is generally less expensive (on an installed basis) when compared to lined stainless steel (or coated stainless steel).

The fiber reinforced plastic may comprise a fabric material such as glass, random glass mat, woven roving, boat cloth, filament winding, or organic (or inorganic) veils as subsequent layers of glass in order to achieve the desired wall thicknesses. For some applications, the aforesaid fabric materials may be impregnated with graphite or carbon fibers or even ceramic fibers to provide increased strength and fire resistance.

A fluoropolymer film may be bonded to fiber reinforced plastic ducts, internal tap collars, and external slip taps using any suitable process. One example is a process for the fluoro-oxidation of ECTFE, which modifies its surface properties so that the film can be adhesively bonded to plastic and metallic surfaces. Other processes can include adhering a fluoropolymer film to a plastic laminate. Other processes, which can be used to bond a fluoropolymer film to a polymeric composite, include plasma treatments, corona etching processes, and sodium etching processes. Suitable fluoropolymer films include polytetrafluoroethylene (PTFE), fluorinated ethylene propylene resin (FEP), perfluoroalkoxy copolymer (PFA), polyvinylidene fluoride (PVDF) and the like. Preferably, the thickness of film 120 is in a range from about 0.001 to about 0.010 inches. More preferably, the film thickness is in the range from about 0.003 to about 0.005 inches. Compared to other plastic materials, fluoropolymers have superior resistance to chemical attack and remain stable at high temperature.

To install the SlipTap assembly, the duct 110 has an opening 120 in the duct. This hole may be custom cut at the installation site. The duct opening 120 is at least large enough to accept the internal tap collar 140; that is, larger than the outside dimensions of the internal tap collar. In one embodiment, the opening is 2 mm greater than the outside diameter of the internal tap collar. One having skill in the art will recognize that other sizes are possible. Any amount over the outside dimensions of the internal tap collar, however, must be less than the flange size so that the flange end of the internal tap collar will remain inside the duct.

The opening 120 is cooperatively structured with the internal tap collar and may have the same general shape as the internal tap collar. In one embodiment, the opening 120 has opposed notches 123 and 124. These notches permit the internal tap collar to be inserted through the opening 120 with notches 123 and 124 from the outside of the duct 110 in long sections of duct where it is impossible or impractical to insert the internal tap collar through one of the ends of the duct 110. For example, in FIG. 1A, only a cross-section of duct is shown for illustrative purposes. In reality, the duct 120 may be very long so that it is impractical to insert the internal tap collar through an open end. In some installations, duct sections may already be connected to other sections of duct when it comes time to install a SlipTap. In either of these situations, it is beneficial to be able to insert the internal tap collar through the duct without having to access an open end of the duct 120. In some instances the open end of the duct 120 may be tens or hundreds of feet away from the desired installation site.

When assembled the internal tap collar 140 fits into the duct opening 120 with the top flange surface 143 in contact with the inner duct surface 111. There may be an adhesive interposed between the surfaces 111 and 143. The first end 145 of the internal tap collar 140 then protrudes out of the opening 120 beyond the outside surface 112 of the duct 120. The inside dimensions of the flange end of the external slip tap are cooperatively structured with response to the first end 145 of the internal tap collar 140. That is, the inside dimensions of the flange end of the external slip tap are slightly larger than the outside diameter of the first end 145.

FIG. 1B shows an assembled view of the SlipTap assembly 100 from the inside of the duct 110. FIG. 1B shows a different view of several elements also shown in FIG. 1A, such as the interior and exterior surfaces of the duct (111, 112), the interior surface of the tap collar 141, and the bottom flange surface 144. The SlipTap assembly further comprises adhesives placed at locations 160 and 161. The adhesive located at 160 seals the joint between the inside surface 111 of the duct and the internal tap collar 140. The binding agent located at 161 seals the joint between the internal tap collar 140 and the external slip tap 170. The combination of the two seals (located at 160 and 161) increases the integrity of the SlipTap assembly as a whole.

The external slip tap 170 has an internal surface 171 that defines a passageway through the external slip tap. The inside dimensions of the internal surface 171 are approximately the same as, or slightly larger than, the outside dimensions of the internal tap collar 140

In some embodiments, the internal tap collar 140 has a flange end with a sheared flange portion 146. A second sheared flange portion may be opposite the other. As described in more detail with respect to FIG. 4B, the sheared portion permits the internal tap collar to fit through opening 120 (avoiding the need to have an open end of duct near the location of the opening).

FIG. 1C shows a three-dimensional cross-section view of the SlipTap assembly in accordance with the present invention. The assembly 110 comprises a duct section 110, an internal tap collar 140, an external slip tap 170, and an adhesive (disposed at 161-166). Although the adhesive is shown by different reference numerals (161-166), it is understood that the adhesive may be a continuous layer formed after the adhesive cures. For example, each of adhesives 161-165 may be a continuous application of an adhesive. As described above, the duct 110 has an inside surface 111 and an outside surface 112. The internal tap collar 140 may comprise an inside surface 141, an outside surface 142, and a flange with a top flange surface 143 and a bottom flange surface 144. The external slip tap 170 may comprise an inner surface 171 of the external slip tap, an exterior passageway surface 172 of the external slip tap, a saddle flange end with a top saddle flange surface 173, and a bottom saddle flange surface 174.

The internal tap collar 140 comprises a cylindrical portion (141, 142) and a flange portion (143, 144). The flange portion has a flange size 148. One having skill in the art will recognize that various flange sizes may be used. The flange size typically is larger than the different between the diameter of the opening in the duct and the outside diameter of the internal tap collar. The flange portion prevents the internal tap collar 140 from moving through the opening in the duct 110. The cylinder portion fits through the opening in the duct 110.

An adhesive may be disposed between the flange portion of the internal tap collar 140 and the duct 110. More specifically, the top surface 143 of the internal tap collar may have an adhesive disposed thereon. For example, the adhesive 165 may be sandwiched between the top surface 143 of the internal tap collar and the duct 110. Additionally, the distal end of the flange portion of the internal tap collar may have adhesive covering it. For example, adhesive 162 may seep out when pressure is applied during the installation process. Excess adhesive may be cleaned up or wiped away before the adhesive 162 cures. Sealing the distal end of the distal end of the flange portion of the internal tap collar is advantageous because it creates an added layer of chemical protection at a critical point of the joint, which will be exposed to corrosives and heat.

An adhesive may be disposed between the internal tap collar 140 and the external slip tap 170. Adhesive 161 may be disposed between the internal tap collar 140 and the external slip tap 170. The adhesive may seep out near the first end (145, not shown in FIG. 1C) when pressure is applied during the installation process. Excess adhesive may be cleaned up or wiped away before the adhesive 161 cures. Sealing in this manner is advantageous because it creates an added layer of chemical protection at a critical point of the joint, which will be exposed to corrosives and heat.

An adhesive may be disposed between the duct 110 and the external slip tap 170. Adhesive 164 may bond the duct 110 to the external slip tap 170. For example, adhesive 164 may be applied to the bottom surface of the bottom saddle flange surface 174 or the outer surface of the duct 112. Pressure may be applied to set the external slip tap onto the duct 110. Adhesive may seep out near the distal end of the saddle flange of the external slip tap (163 and 163') when pressure is applied during the installation process. Excess adhesive may be cleaned up or wiped away before the adhesive cures. This third layer of sealant is advantageous because it creates an added layer of chemical protection at a critical point of the joint.

An adhesive may be disposed between the duct 11, the internal slip tap 140, and the external slip tap 170. Adhesive 166 may be disposed between the duct (where the opening is located), the internal tap collar 140 (where the cylindrical portion meets the flange portion), and the external slip tap 170 (where the cylindrical portion meets the flange portion). This adhesive placement seals gaps created when cutting the opening (120, not shown in FIG. 1C) slightly larger than the outside dimensions of the cylindrical portion of the internal tap collar.

II. Embodiments of an Exemplary Installation Clamp

Figure 2:
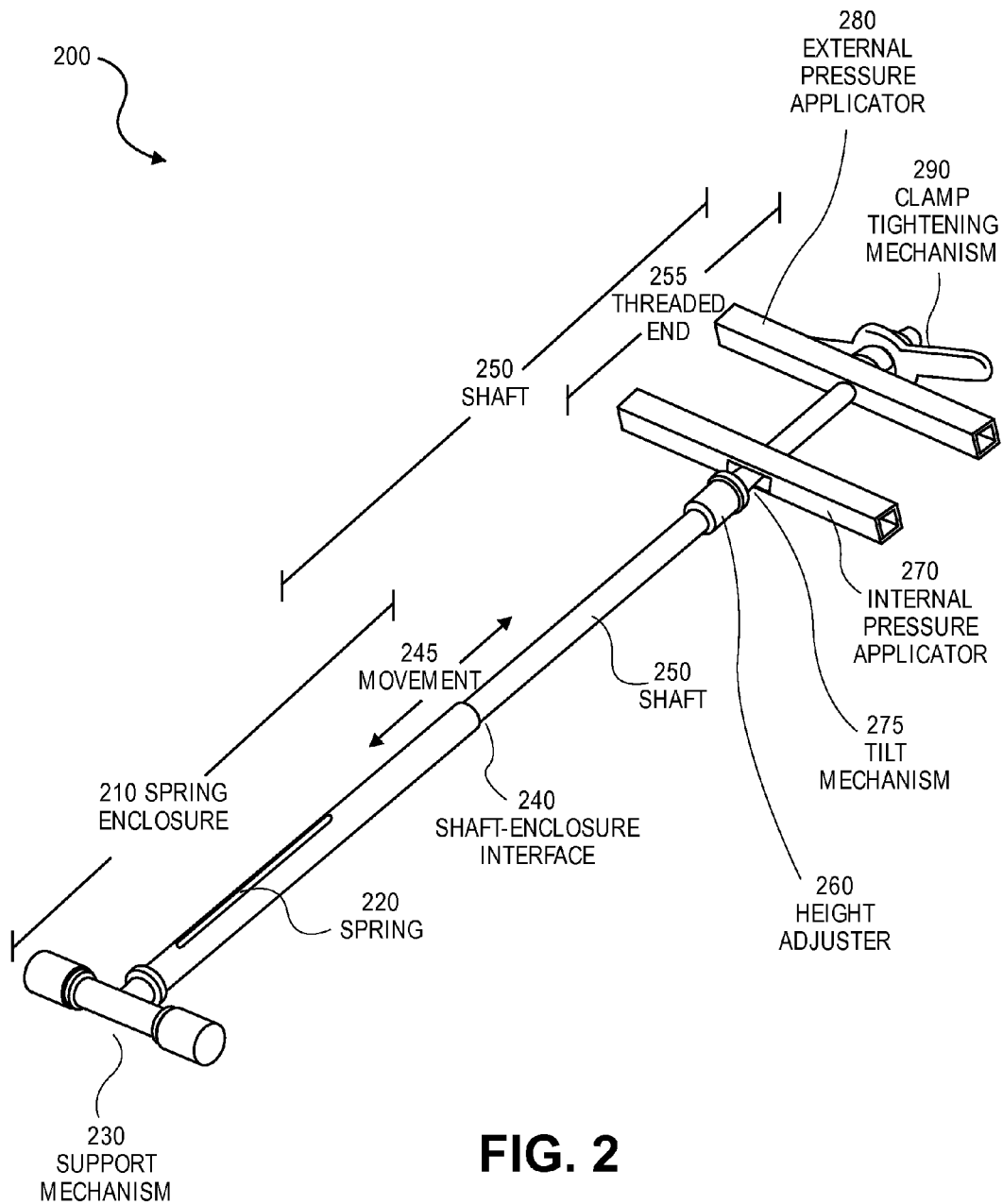
FIG. 2 shows an installation tool in accordance with the present invention.

FIG. 2 shows an exemplary installation clamp tool for use in installing a SlipTap assembly in accordance with the present invention. The installation clamp tool 200 comprises spring enclosure 210, spring 220, support mechanism 230, shaft-enclosure interface 240, shaft 250, threaded end 255, height adjuster 260, internal pressure applicator 270, tilt mechanism 275, external pressure applicator 280, and clamp tightening mechanism 290.

One end of the installation clamp tool comprises the spring enclosure 210, which houses a spring 220, and a support mechanism 230. The support mechanism 230 is shown as a "T-Bar"; however, one having skill in the art will recognize that any suitable support will suffice. For example, a support means could include an end cap made of rubber, for example. The purpose of support mechanism 230 is to provide support for the rest of the installation clamp tool 200. When in use the support mechanism 230 is in contact with the interior surface of the duct 110 (see FIG. 1A). The support mechanism 230 rests against the interior surface of the duct 110 so that pressure may be applied to the SlipTap assembly.

The shaft-enclosure interface 240 is where the shaft 250 meets the spring enclosure 210. The spring 220 permits movement of the shaft relative to the spring enclosure 210 along the arrows 245. Movement 245 allows the internal pressure applicator to be inserted into the opening 120 (see FIG. 1A) and to apply pressure to the bottom flange surface 144 of the internal tap collar 140 (see FIG. 1A). Application of pressure (by the spring 220) to the bottom flange surface 144 of the internal tap collar 140 holds the internal tap collar in place with the rest of the installation until the external pressure applicator 280 is placed on and the clamp tightening mechanism is tightened.

Shaft 250 may comprise metal and a threaded end 255. In one embodiment, the threaded end 255 permits a height adjuster 260 to be positioned as appropriate. In one embodiment, height adjustment may not be required (e.g., installation of fixed size duct) and therefore the height adjuster may be permanently fixed (i.e., not adjustable). In any event, when in use, the distance from the height adjuster 260 and the support mechanism 230 is approximately the inside diameter of the round duct or the interior dimensions of square or rectangular duct. The overall length of the installation tool should be slightly longer than the diameter or dimensions of the duct plus the height of the throat of the external slip tap.

The internal pressure applicator 270 is configured to apply pressure from the inside of the duct 110 to the bottom flange surface 144 of the internal tap collar 140 (see FIG. 1A). This is described in more detail with respect to FIGS. 6A-B. The internal pressure applicator 270 is at least larger than the diameter of the cylindrical portion of the internal tap collar because it needs to apply pressure to the bottom flange surface 144 of the internal tap collar 140. The internal pressure applicator 270 may comprise a tilt mechanism 275 that allows the internal pressure applicator to tilt so that it may fit through the opening 120.

The external pressure applicator 280 is similar to the internal pressure applicator except the external pressure applicator 280 is configured to apply pressure to the second end 175 of the external slip tap collar 170. When in use, the distance between the external pressure applicator 280 and the internal pressure applicator 270 is approximately the height of the throat of the external slip tap. The external pressure applicator 280 is placed onto the assembly tool as described further with respect to FIG. 7.

The clamp tightening mechanism 290 is configured to "pull" the internal pressure applicator 270 and the external pressure applicator 280 together while the adhesive cures. In one embodiment, the clamp tightening mechanism 290 may be a nut or a nut with a handle coupled thereto for ease of tightening.

III. Embodiments of an Exemplary Method

Figure 3:
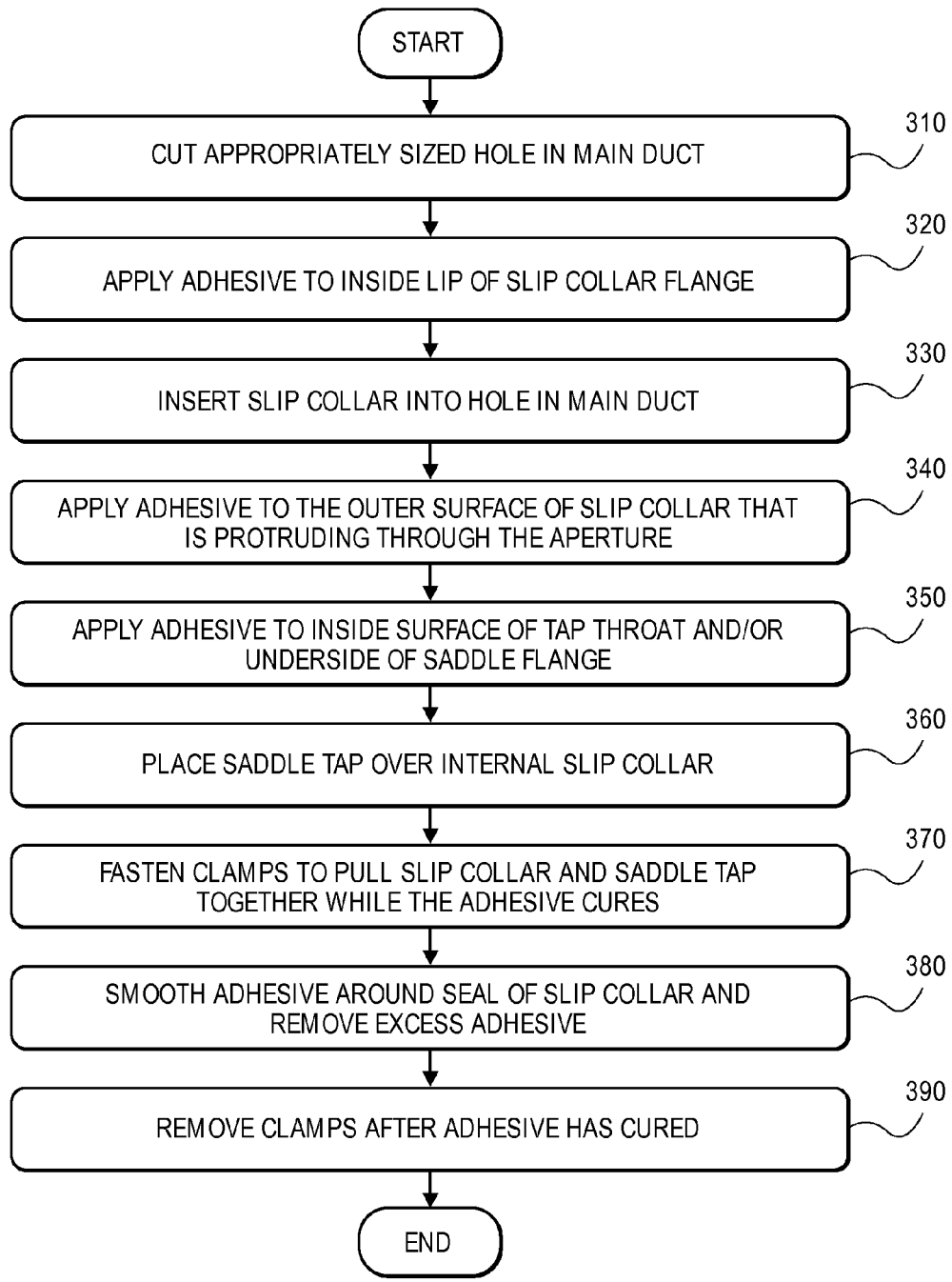
FIG. 3 shows a method of assembling the saddle tap, internal slip collar, and duct in accordance with the present invention.

FIG. 3 shows an exemplary method of assembling a saddle tap with internal slip collar in accordance with the present invention. One having ordinary skill in the art will appreciate that these steps can be performed in any suitable order and one or more of the following steps may be omitted without departing from the scope of the present invention.

In step 310, an appropriately sized hole is cut in the main duct (15 in FIGS. 1A and 215 in FIG. 2A). In one embodiment, an appropriately sized hole includes notches (see FIGS. 4A-B) that permit the internal collar to fit through the hole. In one embodiment, a template is used to outline a slotted cutout (i.e., a hole in a section of duct). A screw may be inserted approximately at the center of the outlined slotted cutout area. One or more holes may be drilled in order to cut out the slotted cutout. A saw may be used to cut the tap, and the screw may be used to grip the area being cut out of the duct.

Notches in the tap cut-out plate allow for the insertion of the internal slip collar from the outside of the duct through the cutout. This is beneficial because, without the ability to insert the internal slip collar, the internal slip collar would have to be inserted from an end of the duct. Inserting from an end of the duct may not be possible or may limit the number of feasible placement options of a saddle tap connection.

In step 320, adhesive is applied to the inside lip of the slip collar flange (143 in FIGS. 1A and 1C) and/or on the inside of the duct along the perimeter of the opening (120 in FIG. 1A). Adhesive may also be applied to the outside of the cylindrical portion of the slip collar flange.

In step 330, the slip collar is inserted into the hole in the main duct (40 in FIGS. 1B and 240 in FIG. 2B). In one embodiment, the slip collar is inserted into the duct cutout through a slotted cutout. The internal slip collar is positioned so that the top side of the flange portion of the internal slip collar is in contact with the inside of the duct (with adhesive disposed in between the duct and the internal slip collar).

In step 340, adhesive is applied to the outer surface of the slip collar that is protruding through the opening from the main duct. In step 350, adhesive is applied to the inside surface of the tap throat and/or the underside of the saddle flange.

If using an installation tool 200 as described in FIG. 2, the installation tool should be inserted and the internal pressure applicator should be positioned. The installation tool may be designed to hold the inner collar against the inside of the duct and the tap against the outside of the duct. The installation tool may comprise a threaded rod, a spring, an internal bar, an external bar, and a nut (or other tightening means). The spring presses the internal bar against the flange on the slip collar into the inner surface of the duct. A bar is then placed over the rod on the outside and a nut is then tightened, forcing the saddle tap into position until the adhesive cures.

In step 360, the saddle tap may be placed over the internal slip collar which is disposed in the slotted cutout in the main duct.

In one embodiment, in step 370, clamps are inserted into the opening of the tap and internal slip collar while the adhesive cures. Standard C-Clamps of suitable size may also be used. If using an installation tool 200 as described in FIG. 2, the external pressure applicator should be positioned. The clamp tightening mechanism should be tightened.

In step 380, the adhesive around the seal of the slip collar is smoothed and excess adhesive is removed. As described above, it may be desirable to leave a small ring of adhesive around each of the mated surfaces. For example, adhesive 160 in FIG. 1B at the mating surface between the duct and the internal collar; adhesive 161 in FIG. 1C at the mating surface between the internal collar and external tap; and adhesive 161 in FIG. 1C at the mating surface between the external tap and the duct. After the adhesive has cured, in step 390, the clamps or installation tool may be removed.

Figure 6A:
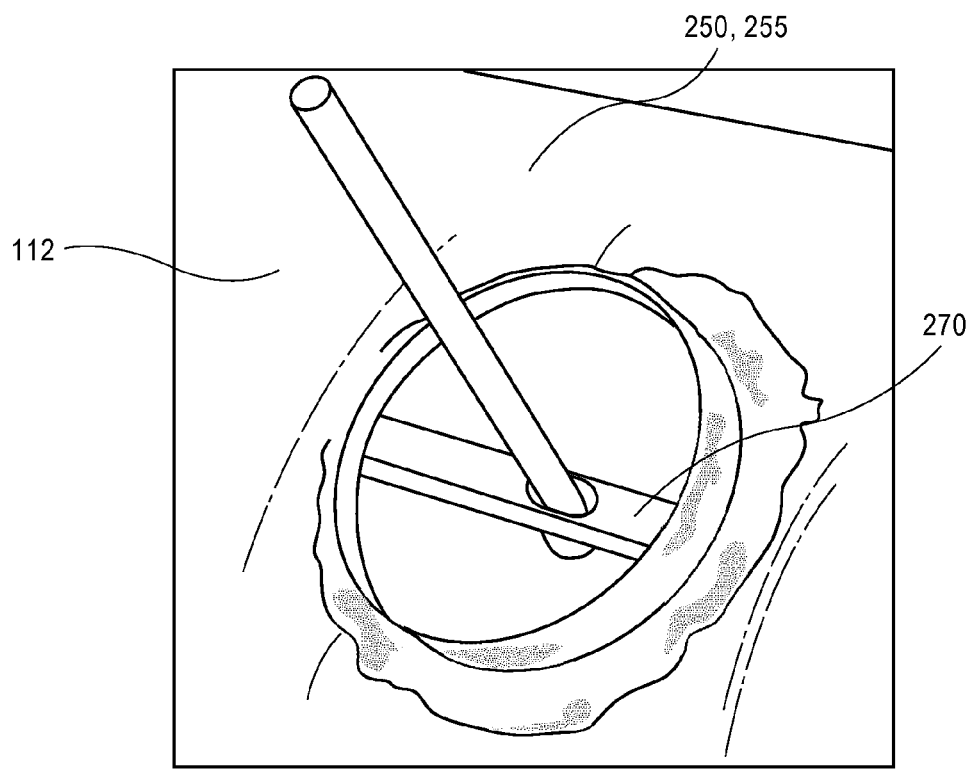
Figure 6B:
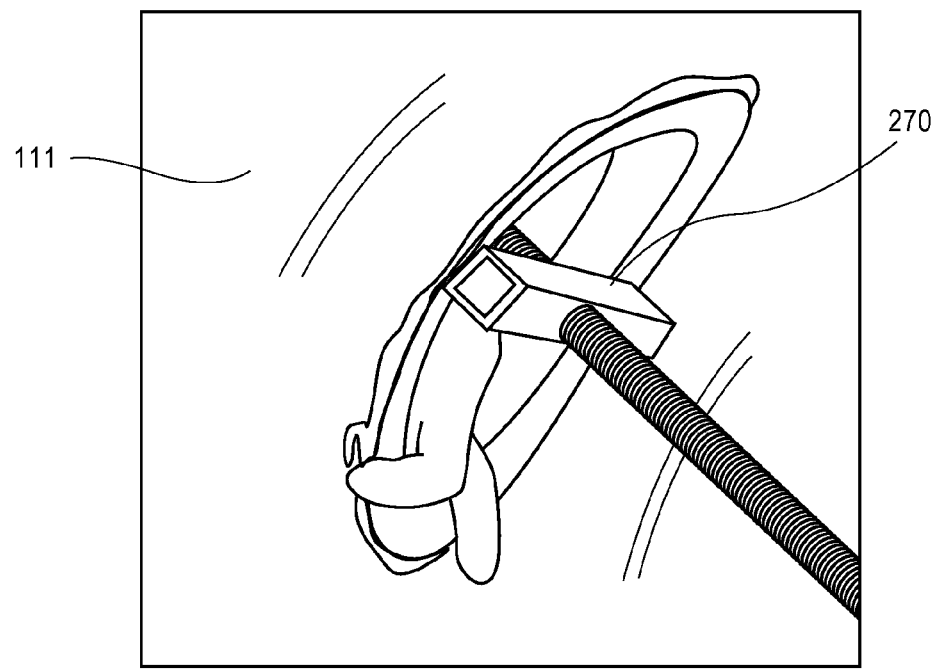
Figure 7:
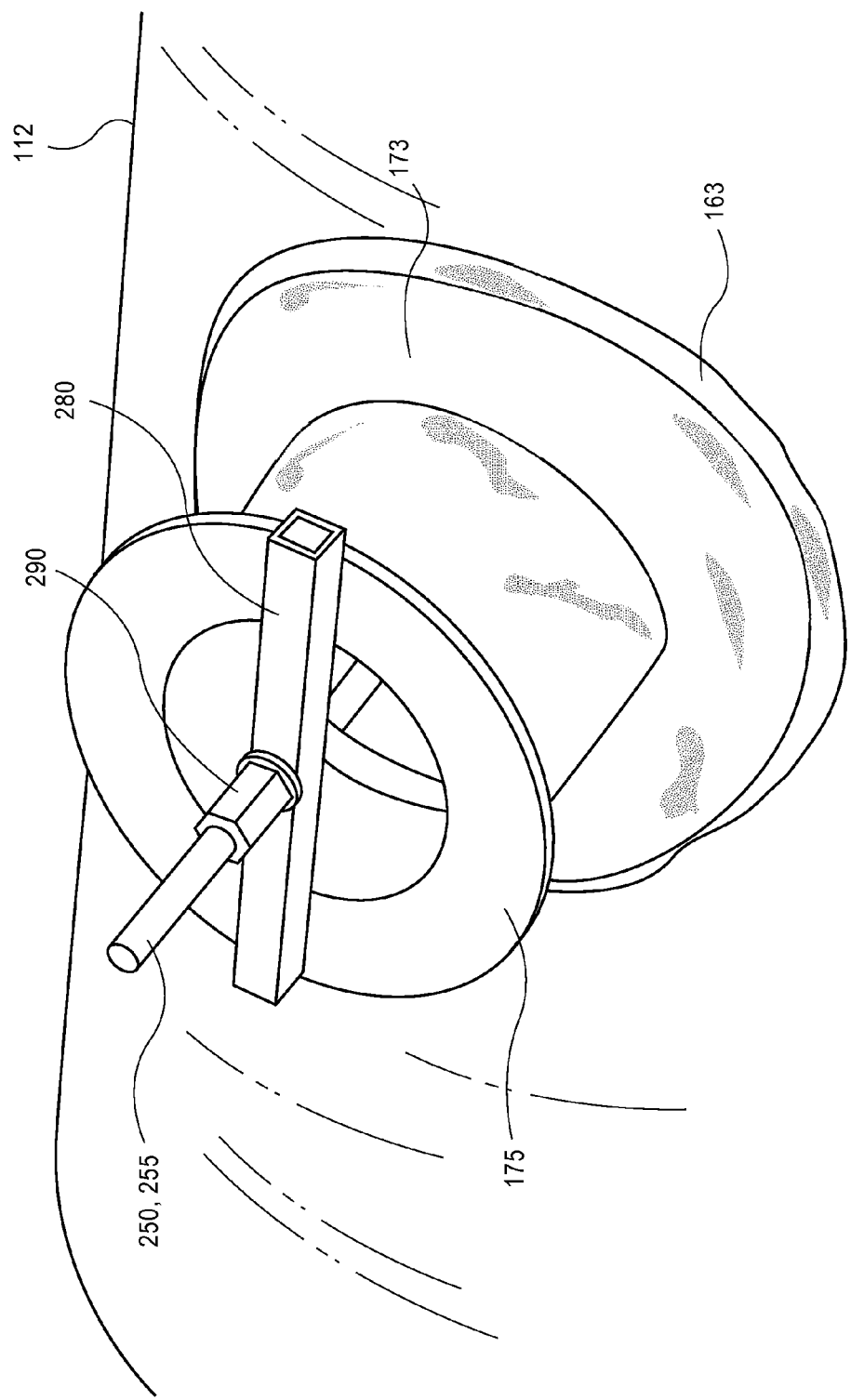

FIGS. 4A-B, 5A-B, 6A-B, and 7 show various steps of the installation process. For example, FIG. 4A shows part of step 310; FIG. 4B shows part of step 330; FIG. 5A shows part of step 340; FIG. 5B shows inserting the installation tool into the duct through the opening; FIGS. 6A-B show positioning of the installation tool; and FIG. 7 shows the installation tool in use while the adhesive cures.

FIG. 4A show a template 410 that is used for cutting the appropriate sized hole in the duct 110. The template 410 is custom fit hole pattern for a particular sized internal collar. In one embodiment, the template has notches 423 and 424. The template may be used to draw trace lines on the duct 110, where the hole will be cut (420).

FIG. 4B shows the inner slip collar as it is inserted through the slots notched (123, 124) into the tap cut-out in the main header. As shown, the internal slip collar 140 has a flange portion 143 that is generally circular with a sheared portion 146 (compare slip collar 40 in FIG. 8A that does not have a sheared portion). There may be more than one sheared portion. For example a second sheared portion may be disposed opposite the first sheared portion. The internal slip collar 140 may be inserted into the opening 120 in the duct. The sheared portion 146 allows the internal collar to fit into opening 120 with notches 123 and 124. For illustration, FIG. 4B shows the internal slip collar in position before adhesive is applied.

FIG. 5A shows the installation tool 200 being inserted through the opening from the outside 112 of the duct. The first end 145 of the internal collar 140 then protrudes out of the opening beyond the outside surface 112 of the duct. An alternative view of various adhesives (161, 163, 164, and 165) is shown at this intermediate step in the installation. FIG. 5B shows the installation tool 200 being inserted through the opening from the view on the inside of the duct. Adhesive 162 at the mating surface between the interior surface of the duct 111 and the internal collar 140 is shown. The support mechanism 230 is shown as it is being moved into position. The working position of support mechanism 230 is resting against the inner surface of the duct so as to provide support for the rest of the installation tool.

FIG. 6A shows the exterior surface 112 of the duct with the internal collar being held in place by the installation tool 200. The shaft 250 with threaded end 255 is protruding from the opening, and the internal pressure applicator 270 is applying an upward pressure from the interior of the duct. FIG. 6B shows the interior surface 111 of the duct with the internal collar being held in place by the installation tool 200. Again, the internal pressure applicator 270 is applying an upward pressure from the interior of the duct.

FIG. 7 shows the installation tool in place while the adhesive cures. Specifically, the external tap 170 is disposed on the outer surface of the duct 112. An adhesive seals the joint between the outer surface of the duct 112 and the top side of the saddle flange. In the embodiment shown, one end of the external tap 175 has a second flange. The installation tool (200) is in place for curing of the adhesive with the external pressure applicator 280 applying pressure downward onto the end 175 of the external saddle tap. The tightening mechanism 290 may provide for varying levels of pressure while the adhesive cures by moving the tightening mechanism 290 to a different position on the threaded end 255 of the shaft 250. Adhesive 163 forms an exterior seal between the top saddle flange surface 173, a bottom saddle flange surface 174, and outer duct surface 112.

IV. Round on Square Embodiments of an Exemplary Saddle Tap with Internal Slip Collar FIG. 8A shows a main duct 10, internal slip collar 40, and tap 70. The main duct 10 is rectangular, but it is understood that other shapes of ducts may be used (e.g., round duct). The main duct 10 has a opening 15 cut in the wall of the duct. In some embodiments, the opening in the duct is approximately 2 mm greater than the outside diameter of the internal slip collar. The size of the opening may vary, however.

The internal slip collar 40 comprises a cylindrical portion with a slip collar flange positioned at one end of the cylindrical portion. The slip collar flange comprises an inside lip that is located on the side of the flange adjacent to the cylindrical portion. The inside lip of the flange will rest against the inner surface of duct 10 when installed. The cylindrical portion of the internal slip collar 40 comprises an inner surface and an outer surface. The internal slip collar may be any suitable size. In one embodiment, the slip collar is 100 mm long with a 25 mm flange. The internal slip collar flange prevents from going all the way the opening 15 in the main duct 10.

The tap 70 comprises a cylindrical portion with a saddle flange positioned at one end of the cylindrical portion. The tap 70 illustrated is a nozzle tap; however, other taps may be used. The saddle flange comprises an underside, or an outside lip. The outside lip of the saddle flange will rest against the outer surface of duct 10 when the tap is installed. The cylindrical portion (also called the "throat") of the tap 70 comprises an inner surface and an outer surface. The throat, however, may be a shape other than a cylinder as shown in FIGS. 1A-C, where the shape of the throat varies from top to bottom. For example, in FIG. 1A, the throat is wider at the base (the saddle flange end) and narrower at the other end. The flared based portion with gradual taper increases airflow, as compared to a cylinder with a constant diameter.

To install the tap 70, a layer of adhesive is applied to the inside lip of the internal slip collar flange 40. Chembond putty mix or any other suitable adhesive may be used. After Chembond has been applied to the inner lip of the internal slip collar 40, the internal slip collar 40 is inserted from the inside of duct 10 into opening 15. This causes a portion of the outer surface of the internal slip collar to protrude from the opening 15.

FIG. 8B shows the main duct 10 and internal slip collar 40 after the internal slip collar 40 has been applied with Chembond and positioned in the opening. Chembond may then be applied to the outer surface of the internal slip collar 40. Chembond may also be applied to the underside of the saddle flange and the inner surface of the tap 70. After Chembond has been applied, the tap 70 slides over the internal slip collar 40. The tap 70 and internal slip collar 40 may be any suitable size to form a tight seal and bond. In one embodiment, the outside diameter of the internal slip collar 40 is approximately equal to, or slightly smaller than, the inside diameter of the tap 70.

FIG. 8C shows the main duct 10 and the tap 70 after the tap has been applied with Chembond and slid over the protruding portion of the internal slip collar (not shown). Clamps (not shown) may be placed through ports to pull the internal slip collar and tap together while the Chembond cures. Before the adhesive cures, excess adhesive may be removed and the seals may be cleaned up.

Clamps are inserted through the inside of the saddle tap and internal slip collar to pull the saddle tap and internal slip collar together while the adhesive cures. When the clamps are tightened, the adhesive may seep out at the inside seal and the outside seal. The inside seal provides an internal corrosion barrier, and the outside seal provides a secondary corrosion barrier that prevents any corrosives that may have penetrated the inside seal from reaching the outside of the duct. The excess adhesive may be wiped away or cleaned up. When the adhesive has adequately cured, the clamps are removed and the saddle tap and internal slip collar form a tightly sealed unit.

While the embodiments of the present invention are shown with rectangular or square main ducts, it is understood that the scope of the invention is not limited as such. For example, one having skill in the art will recognize that the saddle tap with an internal slip collar connection may be adapted to be used with round or oval shaped main ducts. In these embodiments, the saddle flange and slip collar flange may be curved.

One having skill in the art will also recognize that the saddle tap and the internal slip collar can be any suitable shape. While the embodiments of the present invention that are illustrated show a cylindrical saddle tap and internal slip collar, it is understood that the scope of the invention is not limited as such. For example, the saddle tap and the internal slip collar pair may be rectangular in one embodiment. In another embodiment, the saddle tap and the internal slip collar pair may be oval. In yet another embodiment, the saddle tap and the internal slip collar pair may be round.

Any shaped tap-collar pair, including round, oval, and rectangular/square, may be attached to any shaped main duct, including round, oval, and rectangular/square main duct. For example: a round shaped tap-collar pair may be used with a round main duct; a round shaped tap-collar pair may be used with an oval main duct; a round shaped tap-collar pair may be used with a rectangular/square main duct; a rectangular/square shaped tap-collar pair may be used on round main duct; a rectangular/square shaped tap-collar pair may be used on oval main duct; a rectangular/square shaped tap-collar pair may be used on rectangular/square main duct; an oval shaped tap-collar pair may be used on round main duct; oval shaped tap-collar pair may be used on oval main duct; or an oval shaped tap-collar pair may be used on rectangular/square main duct. The main duct and the tap-collar pair may be any size suitable for the particular application.

V. Advantages

There are numerous technical advantages of the embodiments of the present invention. On-site assembly of saddle taps allows for flexibility in the event of jobsite changes and the like. However, conventional methods for on-site saddle tap installation are expensive and time consuming. For example, sanding is not required, and therefore embodiments of the present invention allow installation of a saddle tap in a fraction of the time when compared to conventional methods.

Because an internal slip collar with a flange is used, the bond between the saddle tap, duct, and internal slip collar is much stronger than bonds used in conventional methods. No inside or outside fiberglass and resin "lay-up" are required to further strengthen the bond. This further reduces the amount of time required to install the saddle tap.

In a harsh chemical environment, leak-proof seals are a necessity. Bolts and screws cannot be used to attach the saddle tap because the screw/bolts would penetrate into the corrosive environment, thereby harming the integrity of the duct. Straps are also not a workable solution to securely fasten the saddle tap to the main duct so that the saddle tap is sturdy and will not fall off or become dislodged if bumped or dropped.

When completed, the assembly of the saddle tap, internal slip collar, and main duct form a double-sealed complete unit. For example, a first seal is created between the inner duct wall and the internal slip collar flange with the adhesive. A second seal is created between the outer duct wall and the saddle flange with the adhesive. Therefore, the ducts do not leak because all connections are sealed throughout the interior and exterior. One advantage to this system is that it does not require the use of gaskets that leak, wear, or fail. By using ATS' Chembond™ or XBond™ joining resin, the joint is sealed with a "chemical weld" effectively making it leak-free.

The assembly of the saddle tap, internal slip collar, and main duct is also self-aligning. Because the saddle tap and the internal slip collar are sized to work in communication with each other, the assembly self-aligns when the clamps are tightened as the adhesive dries.

The embodiments with a slotted cutout and an internal slip collar with sheared flange have technical advantages, including increased locations for installation and ease of installation. The installation tool allows the installer to securely install the internal slip collar and tap. The installation tool increases the strength of the bond, decreases installation time, and frees the hands of the installer.

A recitation of "a", "an" or "the" is intended to mean "one or more" unless specifically indicated to the contrary.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

Moreover, one or more features of one or more embodiments of the invention may be combined with one or more features of other embodiments of the invention without departing from the scope of the invention.

All patents, patent applications, publications, and descriptions mentioned above are herein incorporated by reference in their entirety for all purposes. None is admitted to be prior art.

What is claimed is:

1. A saddle tap assembly comprising:
a duct with an opening, wherein the opening includes one or more notches;
an internal slip collar with a flange end and a collar end, wherein the collar end is configured to fit into the opening in the duct and the flange end is configured to prevent the internal slip collar from completely passing through the opening; and
an external saddle tap with a saddle flange end, wherein the saddle tap is configured to slide over the internal slip collar and the saddle flange end is configured to rest on an outside surface of the duct; and an adhesive disposed between the internal slip collar and the external saddle tap.

2. The saddle tap assembly of claim 1 further comprising: an adhesive disposed between the internal slip collar and the duct.

3. The saddle tap assembly of claim 2 further comprising: an adhesive disposed between the duct and the external saddle tap.

4. The saddle tap assembly of claim 3, wherein the adhesive disposed between the duct and the external saddle tap forms an external sealing ring.

5. The saddle tap assembly of claim 2, wherein the adhesive disposed between the internal slip collar and the duct forms a second internal ring seal that may be exposed to corrosive environments.

6. The saddle tap assembly of claim 1, wherein the adhesive disposed between the internal slip collar and the external saddle tap forms a first internal ring seal that may be exposed to corrosive environments.

7. The saddle tap assembly of claim 1, wherein the duct comprises fiber-reinforced plastic and a fluoropolymer film.

8. An assembly comprising:
a duct with an opening, wherein the opening includes one or more notches;
an internal slip collar including
a cylindrical portion having a first end and a second end, wherein the cylindrical portion defines a first passageway between the first end and the second end; and
a flange, wherein the flange is coupled to the second end, wherein the first end is adapted to fit through an opening in a duct section, wherein the flange prevents the internal slip collar from completely passing through the opening in the duct section, wherein the flange is a generally circular flange that extends outward radially from the cylindrical portion and the flange comprises a first sheared side and a second sheared side;
an external saddle tap including
a throat portion having a first end and a second end, wherein the throat portion defines a second passageway between the first end and the second end, and
a saddle flange coupled to the first end and adapted to fit over the internal slip collar when the first end of the internal slip collar has been fit through the opening in the duct section.

9. The assembly of claim 8, wherein the first and second sheared sides of the flange permit the internal slip collar to fit through the opening, wherein the opening comprises a first notch and a second notch.

10. The assembly of claim 8 wherein the internal slip collar comprises a flange that prevents the internal slip collar from completely passing through the opening in the duct section.

11. The external saddle tap of claim 10, wherein the external saddle tap comprises fiber reinforced plastic and a fluoropolymer film.

12. A method of installing a saddle tap assembly comprising:
obtaining a section of duct;
obtaining an internal slip collar with a flange end and a collar end;
obtaining an external saddle tap with a saddle flange end;
cutting an opening in the duct, wherein the opening is sized to accept the collar end of the internal slip collar, wherein the opening comprises one or more notches, wherein the one or more notches permit passage of the internal slip collar when appropriately positioned;
applying an adhesive to the internal slip collar, wherein the adhesive is applied to an inside lip of the flange end of the internal slip collar;
disposing the internal slip collar in the opening; and
disposing the external saddle tap over the internal slip collar, wherein the saddle flange end is positioned over the collar end of the internal slip collar.

13. The method of claim 12 further comprising: applying an adhesive to the external saddle tap, wherein the adhesive is applied to a bottom surface of the saddle flange end of the external slip collar.

14. The method of claim 13, further comprising applying clamps to the saddle tap assembly after the external saddle tap has been disposed over the internal slip collar while the adhesive cures.

15. The method of claim 12, wherein the flange end prevents the internal slip collar from passing through the opening.

16. The method of claim 12, wherein the flange end comprises a radial flange with a first sheared portion and a second sheared potion.

17. An assembly comprising:
a duct with an opening, wherein the opening includes one or more notches;
an internal slip collar including
　a cylindrical portion having a first internal slip collar end and a second internal slip collar end, and
　a flange, wherein the flange is coupled to the second internal slip collar end, wherein the first internal slip collar end is adapted to fit through an opening in a duct section, wherein the flange prevents the internal slip collar from completely passing through the opening in the duct section, and wherein the flange is a generally circular flange that extends outward radially from the cylindrical portion and the flange comprises a first sheared side and a second sheared side;
an external saddle tap including
　a throat portion having a first external saddle tap end and a second external saddle tap end, and
　a saddle flange coupled to the first external saddle tap end and adapted to fit over the internal slip collar when the first internal slip collar end has been fit through the opening in the duct section; and an adhesive disposed between the internal slip collar and the external saddle tap.

\* \* \* \* \*